United States Patent
Notargiacomo et al.

(10) Patent No.: US 11,171,680 B2
(45) Date of Patent: Nov. 9, 2021

(54) RADIO EQUIPMENT AUTOMATIC REDUNDANT ARCHITECTURE

(71) Applicant: TEKO TELECOM S.R.L., Castel San Pietro Terme (IT)

(72) Inventors: Massimo Notargiacomo, Castel San Pietro Terme (IT); Roberto Orlandini, Castel San Pietro Terme (IT); Giovanni Chiurco, Castel San Pietro Terme (IT); Giulio Gabelli, Castel San Pietro Terme (IT); Flavia Martelli, Castel San Pietro Terme (IT); Giuseppe Soloperto, Castel San Pietro Terme (IT)

(73) Assignee: Teko Telecom S.r.l., Castel San Pietro Terme (IT)

( * ) Notice: Subject to any disclaimer, the term of this patent is extended or adjusted under 35 U.S.C. 154(b) by 125 days.

(21) Appl. No.: 16/479,710

(22) PCT Filed: Jan. 19, 2018

(86) PCT No.: PCT/IB2018/050340
§ 371 (c)(1),
(2) Date: Jul. 22, 2019

(87) PCT Pub. No.: WO2018/134777
PCT Pub. Date: Jul. 26, 2018

(65) Prior Publication Data
US 2021/0152207 A1  May 20, 2021

(30) Foreign Application Priority Data
Jan. 20, 2017 (IT) .......................... 102017000006409

(51) Int. Cl.
*H04B 1/40* (2015.01)
*H04W 88/08* (2009.01)
(Continued)

(52) U.S. Cl.
CPC ............ *H04B 1/40* (2013.01); *H04W 88/085* (2013.01)

(58) Field of Classification Search
None
See application file for complete search history.

(56) References Cited

U.S. PATENT DOCUMENTS 8,521,200 B2 * 8/2013 Sattele ............. H04L 12/40032
455/507
9,584,218 B2 * 2/2017 Lins de Medeiros . H04B 10/03
(Continued)

FOREIGN PATENT DOCUMENTS

EP          3076750 A1   10/2016
WO     2014/075725 A1    5/2014

*Primary Examiner* — Pablo N Tran
(74) *Attorney, Agent, or Firm* — David B. Tingey; Bryant J. Keller; Kirton McConkie

(57) ABSTRACT

The radio equipment automatic redundant architecture comprises a plurality of Point of Interface units provided with: a Slave port able to receive a link; at least a Master port able to forward the link incoming in the Slave port; at least a Redundant port with same Slave port capabilities; wherein a first Point of Interface unit has the Slave port connected to a corresponding first Master port of a radio base station or similar device and the Master port connected to a Slave port of one of the others Point of Interface units, a second Point of Interface unit has the Redundant port connected to a corresponding second Master port of the radio base station or similar device and the Master port connected to a Redundant port of one of the others Point of Interface units.

7 Claims, 4 Drawing Sheets

(51) Int. Cl.
*H04L 12/24* (2006.01)
*H04B 7/00* (2006.01)

(56) References Cited

U.S. PATENT DOCUMENTS

| | | | | |
|---|---|---|---|---|
| 9,948,419 | B2* | 4/2018 | Ruffini | H04B 1/7073 |
| 10,278,171 | B2* | 4/2019 | Landry | H04W 4/029 |
| 2004/0185779 | A1* | 9/2004 | Boetzel | H04W 74/06 |
| | | | | 455/41.3 |
| 2004/0264372 | A1* | 12/2004 | Huang | H04L 45/00 |
| | | | | 370/230 |
| 2005/0169201 | A1* | 8/2005 | Huylebroeck | H04W 74/06 |
| | | | | 370/311 |
| 2006/0116075 | A1* | 6/2006 | Gallo | H04L 12/189 |
| | | | | 455/41.2 |
| 2008/0089689 | A1 | 4/2008 | Sakama | |
| 2011/0032882 | A1* | 2/2011 | Zechlin | H04W 74/02 |
| | | | | 370/329 |
| 2011/0032910 | A1* | 2/2011 | Aarflot | H04W 88/085 |
| | | | | 370/335 |

* cited by examiner

RADIO EQUIPMENT AUTOMATIC REDUNDANT ARCHITECTURE

TECHNICAL FIELD

The present invention relates to a radio equipment automatic redundant architecture.

BACKGROUND ART

In the field of telecommunications it is known the use of Distributed antenna systems (DAS) for providing wireless service within a geographic area or structure.

DAS is a network of spatially separated Remote antenna Heads (RH), connected to a series of Base Stations (BS) through a series of Points Of Interface (POI) and a Combining-Splitting (CS) section.

It is also known the need to use a Point of Interface network which is redundant in order to recover the service as soon as a failure occurs.

DISCLOSURE OF THE INVENTION

The main aim of the present invention is to provide a radio equipment automatic redundant architecture with an inner dynamic redundant network that activates in case of failure.

BRIEF DESCRIPTION OF THE DRAWINGS

Another object of the present invention is to provide a radio equipment automatic redundant architecture, which allows to minimize the number of hop to link all the Point of Interface units.

The above-mentioned objects are achieved by the present radio equipment automatic redundant architecture according to the features of claim 1.

Figure 1:
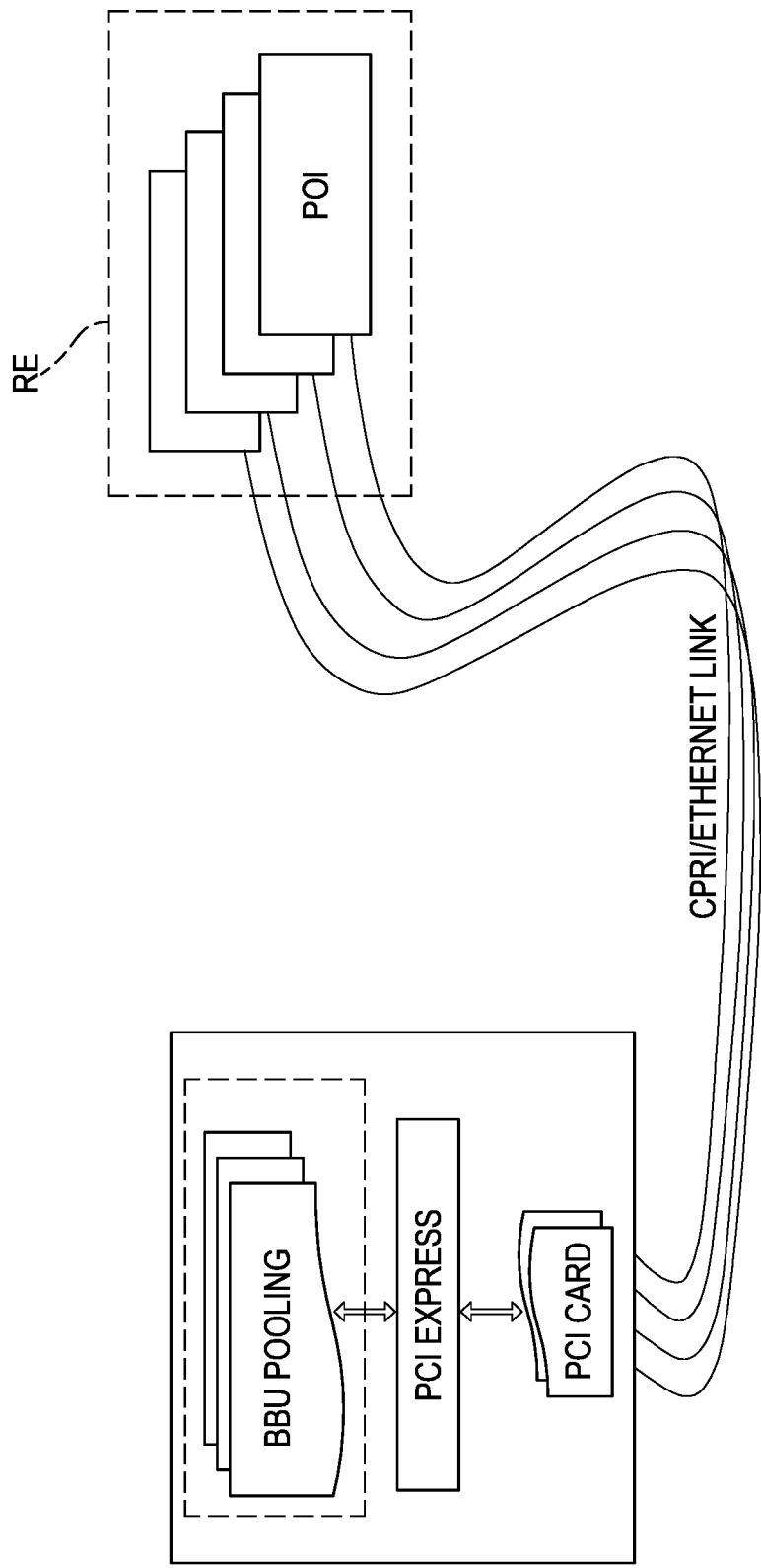

Other characteristics and advantages of the present invention will become better evident from the description of a preferred, but not exclusive embodiments of a radio equipment automatic redundant architecture, illustrated by way of an indicative but non-limiting example in the accompanying Figures, in which:

FIG. 1 shown an example of possible application of the radio equipment according to the invention.

Figure 2:
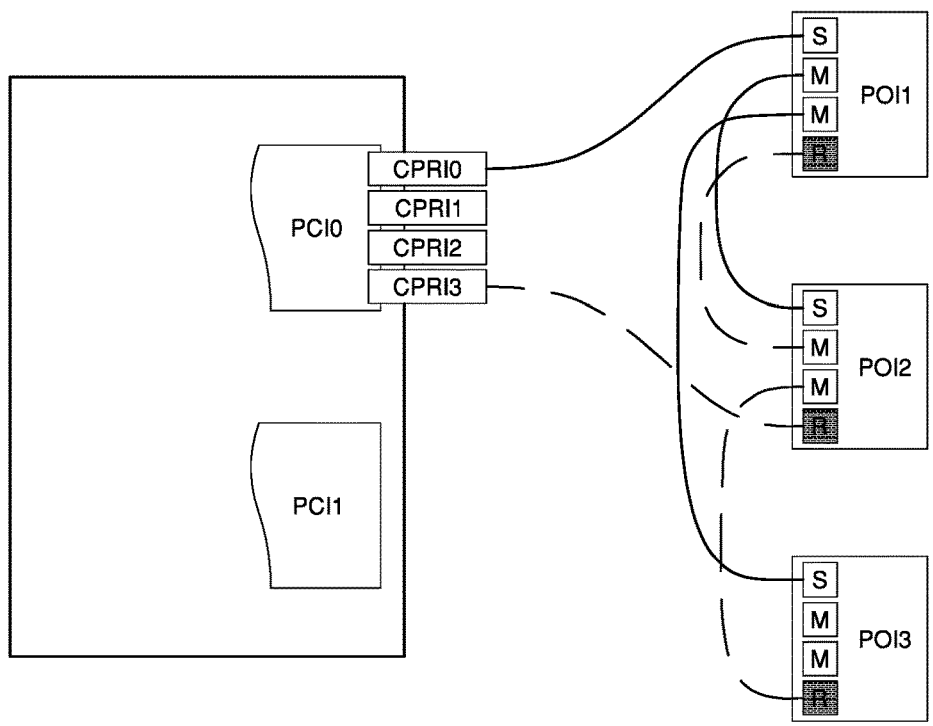
Figure 3:
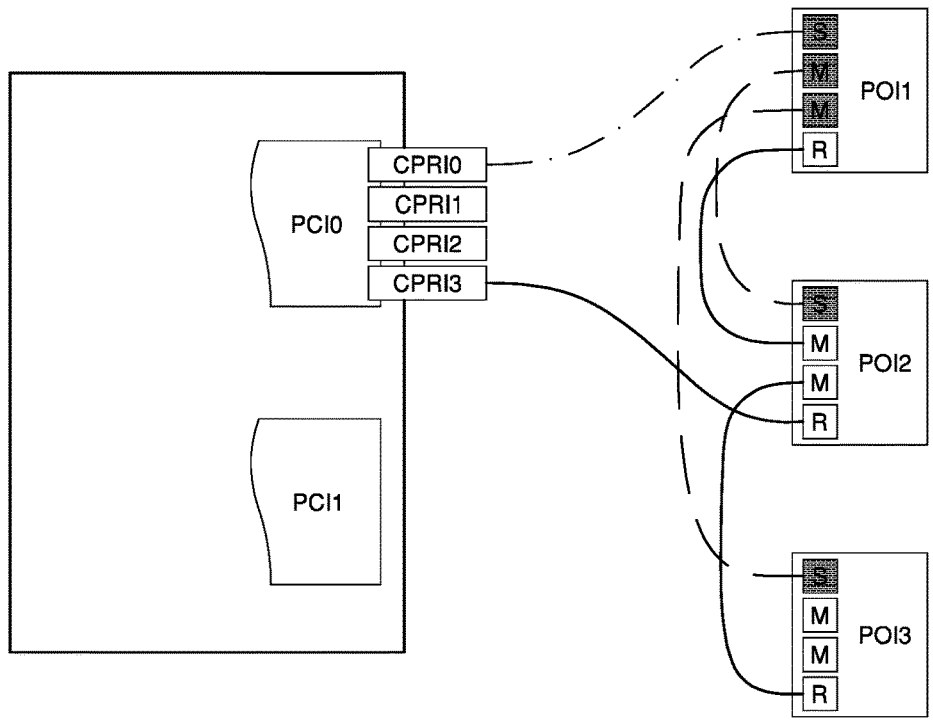
Figure 4:
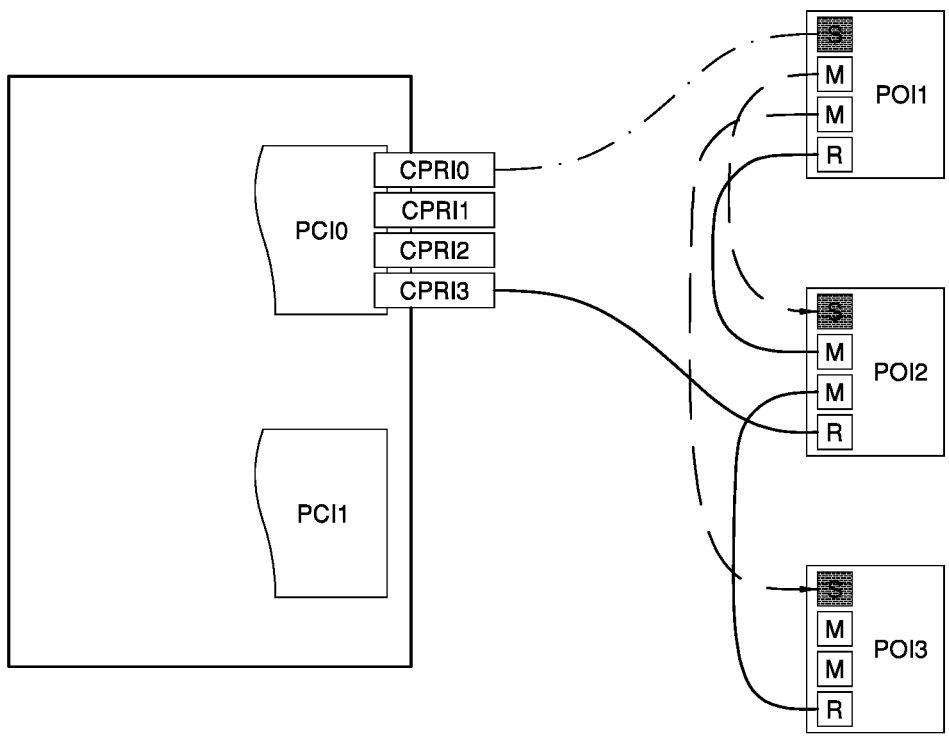
Figure 5:
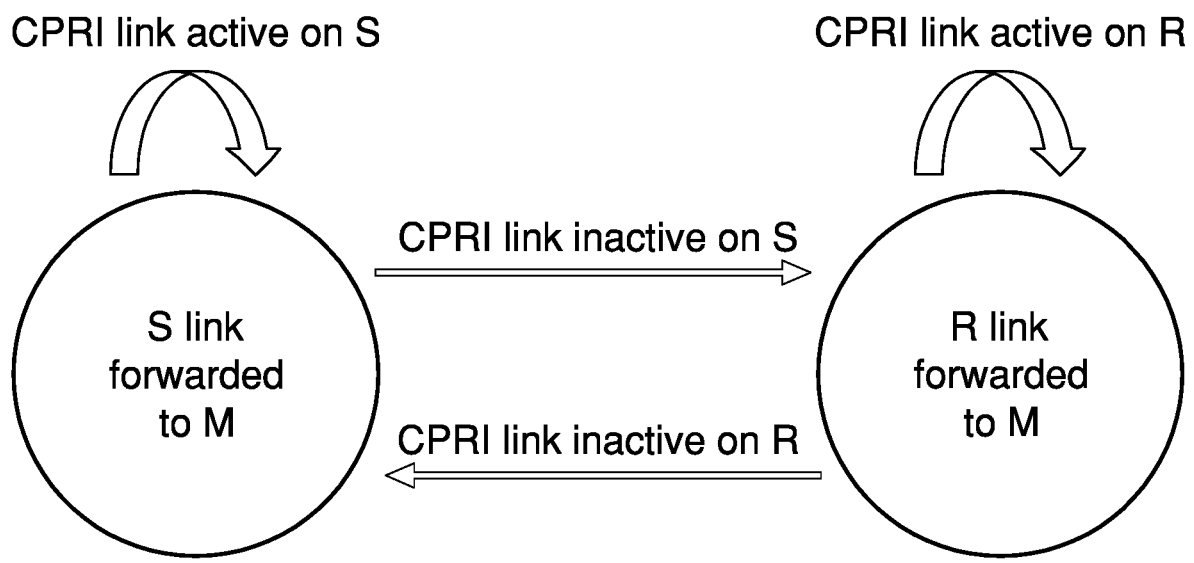
Figure 6:
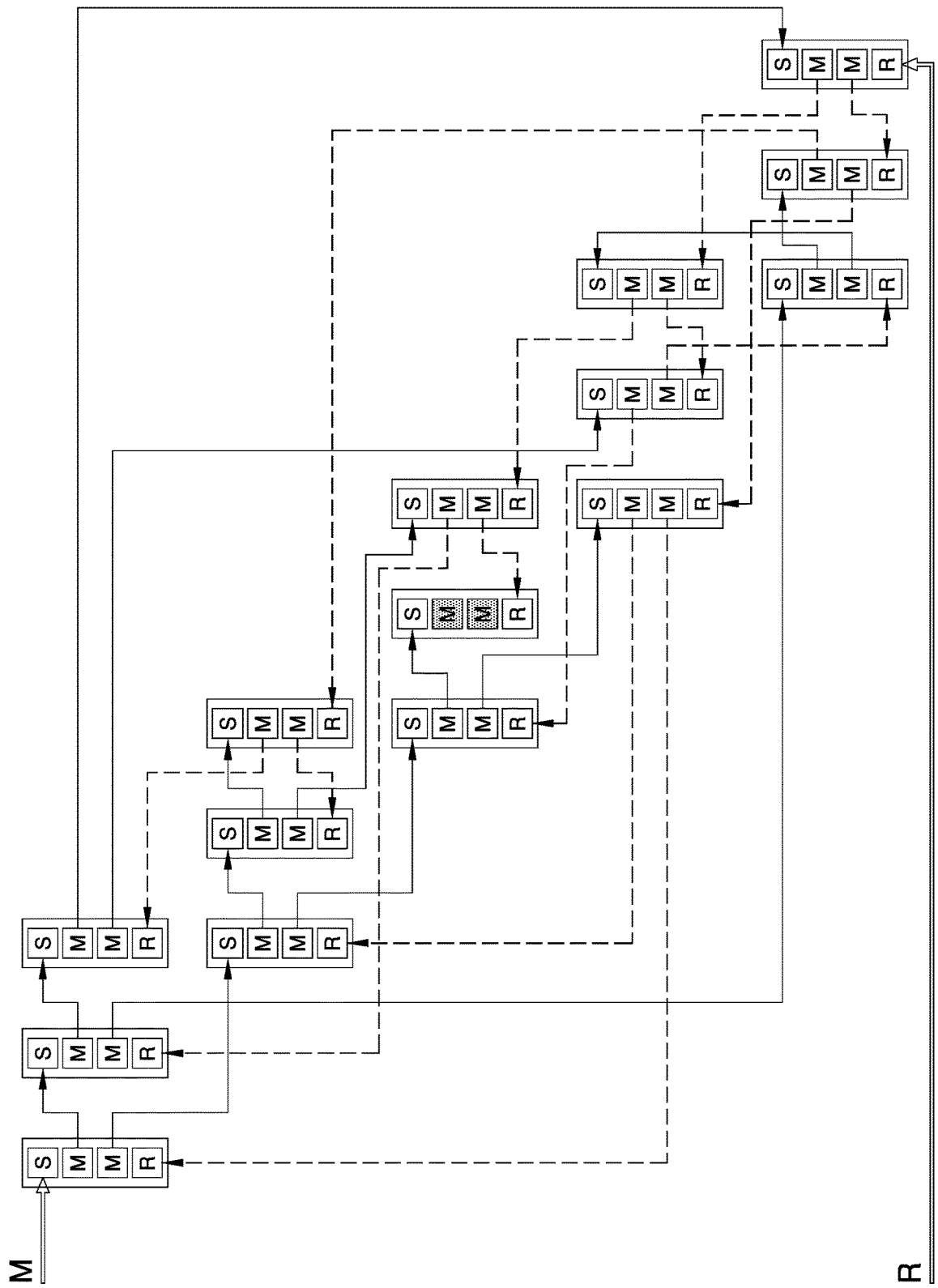

FIGS. 2, 3 and 4 show an example of step by step description of dynamic recovery of the radio equipment according to the invention in case of Main link failure;

FIG. 5 is a status diagram showing the specific dynamic recovery logic of the radio equipment according to the invention;

FIG. 6 illustrates a possible scheme of a fully-interconnected RE network.

EMBODIMENTS OF THE INVENTION

With particular reference to such illustrations, globally indicated with reference RE is a radio equipment automatic redundant architecture.

Particularly, with reference to the specific embodiment of the invention disclosed and showed in the figures, the radio equipment RE is constituted by a Point of Interface (POI) network feeding a Distributed Antenna System (DAS).

With reference to the specific embodiment showed in FIG. 1, the Radio Equipment according to the invention could be connected to a PCI card of a BBU pool. For example, the BBU pool could be software-implemented. However, the connection to different apparatuses is not excluded.

Specifically, the embodiment showed in the Figures and disclosed below relates to a Radio Equipment RE defined according to the Common Public Radio Interface (CPRI) standard.

However, the invention can be applied to different type of radio equipment.

Particularly, it is not excluded the use of the Radio Equipment RE according to the invention in different types of interfaces implementing a Master/Slave architecture.

For example, the radio equipment RE can be of the type of a Remote Radio Head (RRH).

The radio equipment RE automatic redundant architecture according to the invention comprises a plurality of Point of Interface units each provided with:
  a Slave port S able to receive a link;
  at least a Master port M able to forward a link incoming in the Slave port S;
  at least a Redundant port R with same Slave port S capabilities.

Usefully, each Point of Interface unit may comprise a plurality of Master ports M able to forward the link incoming in said Slave port S.

Furthermore, each Point of Interface unit may comprise a plurality of Redundant ports R with same Slave port S capabilities.

With reference to the example showed in FIGS. 2, 3 and 4, the radio equipment RE is schematized with three interconnected Point of Interface units POI1, POI2 and POI3.

Each Point of Interface unit POI1, POI2 and POI3 has two Master ports M for forwarding the link incoming in the Slave port S and a single Redundant port R.

However, the use of different configurations with a different number of Master ports M or Redundant ports R is not excluded.

The radio equipment RE comprises a first Point of Interface unit POI1 provided with a Slave port S connected to a corresponding first Master port of a radio base station BTS (or a similar device).

Particularly, according to the possible embodiment of the invention illustrated in FIGS. 2, 3 and 4, the Slave port S of the first Point of Interface unit POI1 is connected to a corresponding Master port CPRI0 of the CPRI (Common Public Radio Interface) type. The Slave port S is able to synchronize with the incoming CPRI link coming from the CPRI0 Master port.

However, it is not excluded the connection to different Master ports of different devices. For example, the Slave port S is also connectable to a server port or to other radio equipment Master port.

Furthermore, with reference to the example showed in FIGS. 1, 2 and 3, each of the Master ports M of the first Point of Interface unit POI1 is connected respectively to a Slave port S of a second Point of Interface unit POI2 and to a Slave port S of a third Point of Interface unit POI3.

The second Point of Interface unit POI2 has the Redundant port R connected to a corresponding second Master port CPRI3 of said radio base station BTS.

The two Master ports M of the second Point of Interface unit POI2 are connected respectively to the Redundant port R of the first Point of Interface unit POI1 and to the Redundant port R of the third Point of Interface unit POI3. The method (automatic rules) for the management of the radio equipment RE according to the invention is disclosed below and an example of dynamic recovery in case of Main link failure is illustrated in FIGS. 2, 3 and 4. FIG. 5 shows the specific dynamic recovery logic by a status diagram.

The method comprises, for each of said Point of Interface units POI1, POI2, POI3, at least a step of detecting the presence/absence of an input link on the slave port S.

In case of detection of the presence of an input link on the slave port S, the method comprises a step of forwarding the link incoming in the Slave port S on the Master ports M. In this condition the Redundant port R is switched off.

In case of detection of the absence of an input link on the slave port S, after a proper timeout, the method comprises the following steps:
  switching off of the Master ports M in order to propagate the unavailability of the CPRI link to the child Point of Interface units POI1, POI2 or POI3;
  activating the redundant port R;
  checking if a redundant CPRI link is available on the redundant port R;
  if a redundant CPRI link is available on the redundant port R, forwarding the redundant CPRI link on the Master port M.

If a redundant CPRI link isn't available on the redundant port R, the method comprises a step of activating, after a proper timeout, the Slave port S, in order to check if a CPRI link is available.

FIGS. 2, 3 and 4 show an example of step by step description of dynamic recovery in case of Main link failure.

FIG. 2 shows a Main configuration, wherein a Main active path is established form the Master port CPRI0 to the Slave port S of the first Point of Interface POI1, and then from the Master ports M of the first Point of Interface POI1 respectively to the Slave port S of the second Point of Interface POI2 and to the Slave port S of the third Point of Interface POI3.

In such a configuration the Slave ports S and the Master ports M are active and the Redundant ports R are inactive.

FIG. 3 shows an example of failure of the Main active path between the first main Master port CPRI0 end the Slave port S of the first Point of Interface POI1.

In this case, the Slave port S of the first Point of Interface POI1 does not detect a CPRI link then (after a proper timeout) the Master ports M of the first Point of Interface POI1 are switched off to propagate the unavailability of the CPRI link to the next Points of Interface POI2 and POI3.

The Redundant port R of the second Point of Interface POI2 is activated to check if a redundant CPRI link is available. When the Redundant port R detects a redundant CPRI link on the Master port CPRI3, then the CPRI link is relaunched on Master ports M of the second Point of Interface POI2. The CPRI link is then propagated to the third Point of Interface POI3.

FIG. 4 shows the configuration of the radio equipment RE when the switchover from the Main failure path to the Redundancy active path is complete.

As a further example, FIG. 5 illustrates a possible scheme of a fully-interconnected RE network.

In practice it has been observed that the described invention achieves the intended purposes.

Thanks to the described radio equipment port assignment and radio equipment automatic rule it is always possible to create a fully-interconnected POI network that:
  minimize the hop to link all the POIs;
  create an inner dynamic redundant network that activates in case of failure.

Particularly, in case of single point of failure at any point of the system then the system will automatically reconfigure.

In case of multiple point of failure, the impact on the system availability is minimized thanks to the fully-interconnected network and the part of the network that is "out of service", thanks to proper timeout, is able to switch between two status of stability and recover the service as soon as the first failure recovers.

The invention claimed is:

1. A method for management of a radio equipment automatic redundant architecture, the method comprising:
  obtaining the radio equipment automatic redundant architecture comprising:
    a plurality of Point of Interface units provided with:
      a Slave port able to receive a link;
      at least a Master port able to forward the link incoming in said Slave port; and
      at least a Redundant port with same Slave port capabilities; wherein:
      a first Point of Interface unit has said Slave port connected to a corresponding first Master port of a radio base station or similar device and said at least a Master port connected to a Slave port of at least one of the others Point of Interface units;
      a second Point of Interface unit has said Redundant port connected to a corresponding second Master port of said radio base station or similar device and said at least a Master port connected to a Redundant port of at least one of the others Point of Interface units;
  detecting, for each of said Point of Interface units, a presence/absence of an input link on said slave port; and
  in case of detection of an absence of an input link on said slave port, at least the following steps:
    switching off of said at least a Master port;
    activating said redundant port;
    checking if a redundant link is available on said redundant port; and
    if a redundant link is available on said redundant port, forwarding said redundant link on said at least a Master port.

2. The method according to claim 1, wherein said Point of Interface units comprise a plurality of Master ports able to forward the link incoming in said Slave port.

3. The method according to claim 1, wherein said Point of Interface units comprises a plurality of Redundant ports with same Slave port capabilities.

4. The method according to claim 1, wherein said Slave port of the first Point of Interface unit is connectable to a corresponding Master port of a CPRI type.

5. The method according to claim 1, constituted by a Point of Interface network feeding a Distributed Antenna System.

6. The method according to claim 1, comprising, in case of detection of the presence of an input link on said slave port, at least a step of forwarding the link incoming in said Slave port on said at least one Master port.

7. The method according to claim 1, comprising at least a step of activating said Slave port, in order to check if a CPRI link is available, if a redundant link is not available on said redundant port.

* * * * *